June 22, 1954  J. R. JEROMSON, JR., ET AL  2,681,564
PAINTED SLIP RING STRUCTURE AND METHOD OF MAKING SAME
Filed April 23, 1953
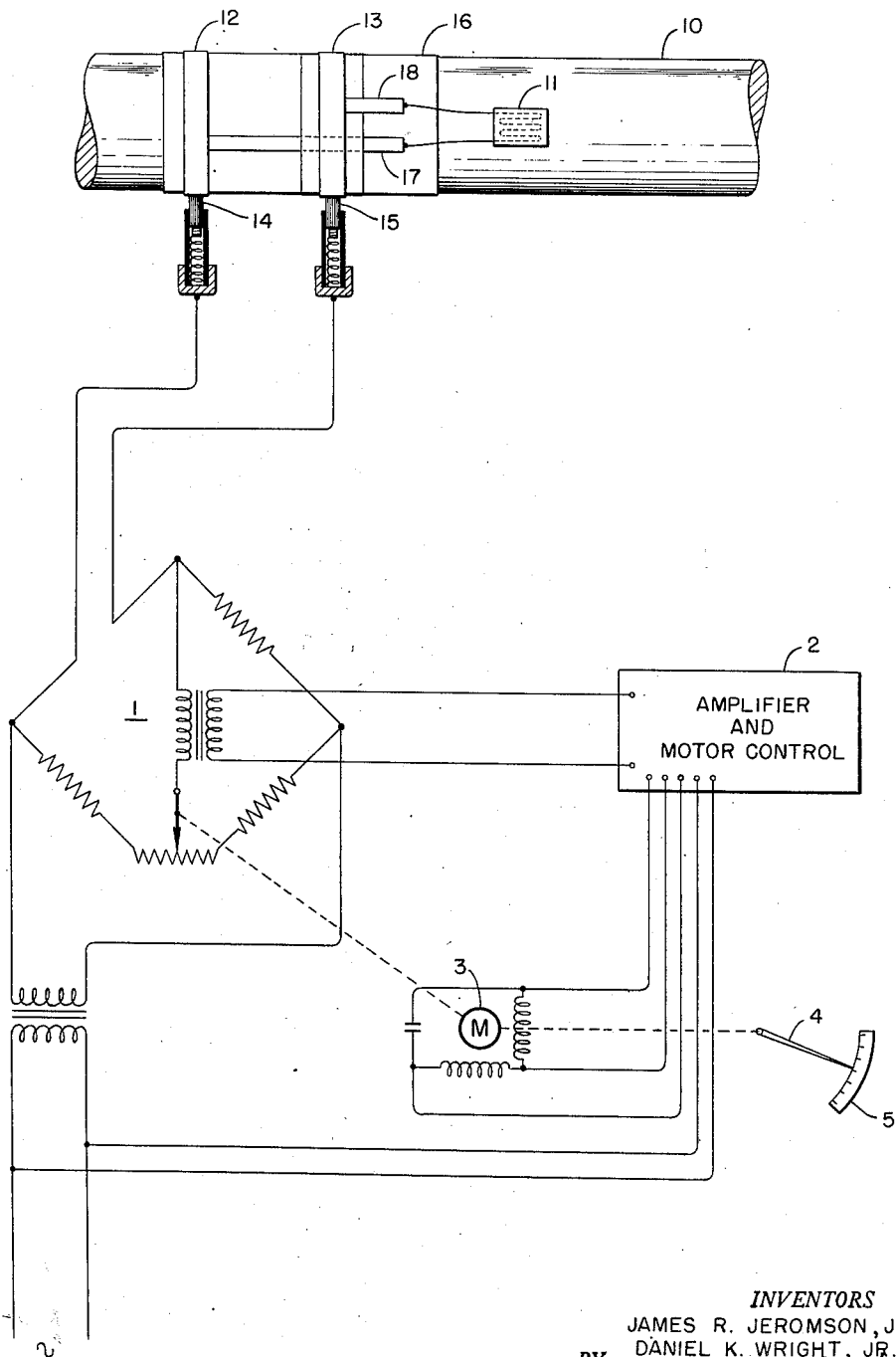
INVENTORS
JAMES R. JEROMSON, JR.
DANIEL K. WRIGHT, JR.
BY
*Arthur L. Wade*
ATTORNEY

UNITED STATES PATENT OFFICE 2,681,564

PAINTED SLIP RING STRUCTURE AND METHOD OF MAKING SAME

James R. Jeromson, Jr., Wickliffe, and Daniel K. Wright, Jr., Cleveland Heights, Ohio Application April 23, 1953, Serial No. 350,550

6 Claims. (Cl. 73—136)

The present invention is directed to conductive coatings, particularly those conductive coatings engaged by sliding contact members maintaining continuous, and consistent, electrical connection therewith.

An immediate application for the invention has been found in strain gage circuits measuring dynamic strain in rotating parts. It is conceivable, however, that the structure of the invention could be used under more rugged physical applications. For example, in motors and generators, as slip rings and commutators, the inventive structure may be used successfully. In fact, wherever, an electrical signal may be taken from, or transmitted to, a rotating shaft, the present invention finds utility.

Conductive coatings have been used for many years to simplify the manufacture of complex electrical circuits, particularly in the radio industry. As familiar as these "printed circuits" have become, the present invention offers a novelty thereover in providing a conductive surface dynamically engaged by a sliding contact. There is no longer a necessity for splitting prefabricated rings in order to fit them over shafts. The present invention provides a ring structure which is formed into a continuous, unbroken conductive surface directly on the shaft, eliminating machining operations as well as the steps of dimensioning and fabricating commonly required by conventional ring structure used on shafts.

The inventive concept extends beyond the structural novelty of continuous rings on rotating members to the method by which the structure is formed. Several steps necessary to success are believed to be obviously novel, considering the conventional manner in which similar materials have been used, and worked, prior to this time.

In a practical embodiment of the immediate application mentioned above, the combination was placed in a potentiometer strain gage circuit as the most severe application slip rings would be subjected to, and tested for accurate reproduction of the signal from the strain gage. The results were accurate within 2½%. With the attainment of these results, it became apparent that this invention would lead to considerable savings in time and money whenever it became necessary to measure strains in rotating machine parts. The time needed to complete the structure of the invention compares with the time required to mount and dry a resistance type strain gage. With the structure of the invention available it will no longer be necessary to drill holes in shafts to carry wires for this application. And additionally, it is to be observed that the strain gages themselves can be connected to the structure by painted circuits and connections. As for flexibility, it is obvious that the structure can either be applied directly to the rotating part or an extension mounted on the part.

The preferred embodiment of the invention will be described in connection with the drawing thereof. Before narrowing the consideration of the invention to the specific embodiment, it will be noted that the primary objective of the present invention is to provide, by a novel method, an improved surface for completing an electrical connection through a sliding contact.

An additional object of the invention is to provide a conductive ring of material on a rotating member to which an electrical signal can be conducted or from which an electrical signal can be taken.

A further object of the invention is to provide a series of steps by which a continuous ring of conductive material is formed on a rotating member.

In the drawing the single figure of the drawing illustrates the preferred embodiment of the invention included in a strain gage circuit.

The use of resistance type strain gages to measure dynamic strain on rotating parts has always involved the problem of transferring an undistorted signal from the gages mounted on the part to the strain analyzer. Slip rings have been used extensively, of course, in transferring the signal. However, the design and manufacture of special slip rings for each project has usually been costly both from a time and material standpoint.

The requirements for satisfactory slip ring combinations are two in number, namely:

1. That they accurately transfer the signal from the strain gages to the strain analyzer.
2. That they wear long enough to permit the necessary dynamic strain data to be obtained.

The first requirement can be met only if the contact resistance between the brushes and the slip rings remains essentially constant.

Although many combinations of slip ring materials and brushes have been tried in the past, the present invention is the first, within the knowledge of the present applicants, where conductive coatings have been utilized successfully. The mere thought of a possibly successful combination utilizing some form of conductive paint carried with it thoughts of simplicity, convenience and savings in time and money to be gained.

The general approach to the solution of the problem of providing conductive rings, applied after the manner of paint, on rotating shafts, naturally includes the general requirements of providing insulation between a metallic shaft and the conductive ring. The general class of materials, and the specific material used in the reduction to practice, will be described subsequently.

In the process of testing many combinations, it was observed that the slip rings improved in performance as they wore in. This suggested the seemingly rather remote possibility of polishing the conductive coating. The conductive coating materials generally available are regarded as susceptible to air-drying. Attempts to polish conductive coatings which were air-dried were generally unsuccessful. Air-dried conductive coatings would not polish to a sufficiently smooth surface to realize the desired results.

It was at this point that it appeared worthwhile investigating application of some degree of heat above ambient. The results of applying elevated temperatures to coating material, conventionally air-dried, yielded surprising results in that they could then be polished with metallographic paper to a very high degree of luster. It was gratifying to note that the contact resistance of the resulting surface was less than plus or minus .01 ohm. A specific conductive coating material which gave this surprising result was E. I. du Pont de Nemours Type A No. 4922 silver conductive coating. To obtain a rough estimate of the life expectancy of the slip rings, a set was run continuously for 120 hours at 1500 R. P. M. with a periodic check on performance. At the end of 120 hours, or a total of 10,800,000 revolutions, the slip rings were still performing satisfactorily. It should be emphasized that, satisfactory as this specific conductive material was, it must be fully recognized that other conductive paints with pigments such as powdered silver, silver oxide and silver nitrate with binders such as linseed oil, cottonseed oil, castor oil, and resin are practical materials for use under the teachings of this invention.

In the drawing a balanceable network has been generally designated at 1 with a conventional motor amplifier controller network at 2. The motor has been specifically, and diagrammatically, illustrated at 3 and is under control of the amplifier motor control network 2 in its mechanical actuation of a recording pen 4 over a scale and chart at 5.

The specific embodiment of the invention included in the foregoing network 1, is associated with a rotating shaft member 10 upon which it is desirable to mount a strain gage resistance unit 11. In order to incorporate the strain gage resistance as a responsive element of the balanceable electrical network 1, the present invention has provided slip rings 12 and 13 which are maintained in constant, and consistent, contact with brushes 14 and 15.

The conventional arrangement for applying a constant pressure to brushes 14 and 15 has been diagrammatically illustrated by springs and housings holding and urging the brushes down upon the surface of rings 12 and 13. The brushes 14 and 15 may be made of soft carbon to reduce the wear between their surface and that of rings 12 and 13.

Structurally, the present invention is disclosed completely by this specific embodiment. No similar structure has been evolved within the art of "printed circuits." Novelty is believed to lie in this structure as well as the unique steps for bringing it together in a combination.

As the shaft member 10 is usually metallic, rings 12 and 13 must be insulated therefrom by a coating 16. This coating may be applied in layers in order that between successive layers, painted connections 17 and 18 may be taken from the rings, connection 17 being insulated by a layer of non-conductive coating from ring 13 in order that both the conductive paths 17 and 18 may be extended to the connections of strain gage unit 11.

It is to be understood that the insulating coating may be any of a number of types of enamels, varnishes or lacquers. However, in the embodiment reduced to practice, Glyptal No. 1201, red enamel, sold by the General Electric Company, proved by far the most satisfactory. The Type A No. 4922 silver conductive coating adhered to the Glyptal enamel with remarkable tenacity. Glyptal enamel will not adhere to brass. However, a thin coat of varnish furnishes an excellent base for Glyptal enamel. Actually, one coat of Glyptal enamel serves as an insulator, however, an imperfection in the coating the size of a pinhole would short out a slip ring. Therefore, two coats of Glyptal enamel can be used, the improbability of two such surface imperfections or pin holes being coincident makes up for lack of skill in applying the material.

The solvent for E. I. du Pont de Nemours Type A No. 4922 silver conductive coating is butyl acetate. Butyl acetate will soften Glyptal enamel if sufficient time is allowed. However, when the conductive coating was applied to the Glyptal enamel, the solvent was found to evaporate so quickly as to not injure the insulating coating.

Taking each of the specific steps developed for maximum satisfaction in results, cleanliness is seen to be a first requisite. The surface of the rotating members should be smooth and free of paint, scale, rust etc. The surface may be throughly cleaned with carbon tetrachloride or acetone. A brush may be used to apply the coatings, although dipping or spraying of the parts is also feasible. A first coat of Glyptal enamel may be sufficiently dried in an oven temperature of 260° F. or with infra-red heat lamps 4 to 6 hours. It is imperative that the Glyptal enamel be throughly dried. If it is not, the solvent in the conductive coating will cause it to curl when the ring is applied. Although drying of the Glyptal enamel by elevated heat is desirable, as a practical matter, in order to conserve time, air drying is feasible in forming a successfully operative structure. The second coat of Glyptal enamel should also be subjected to one of the drying procedures.

In liquid form, the conductive coating itself is preferably reduced to the consistency of coffee cream. A fine artist's brush may be used to build up five or six coats of this material, allowing five minutes of air drying time between coats. The completed structure should be either baked in an oven at 350° to 375° F., or with infra-red lamps for at least 6 hours.

Properly dried ring structures will have an orange color subsequent to baking, indicating that the binder has been driven to the surface. If the rings do not polish, they should be allowed to dry for awhile longer in the oven at the same temperature or in the case of infra-red lamps, with the lamps placed closer to the part.

The rings should not be tested for short circuits until they have throughly dried. The solvents are fair conductors and a test before the rings are dry will prove disappointing.

The rings should next be polished and metallographic emery paper has been found satisfactory for this purpose. A specific order, found to be satisfactory is No. 1 (coarse), No. 0, No. 2/0 and No. 3/0 (fine). Properly polished rings will resemble high quality silver plate and will present a surface to the brush contact which will achieve the objects of the invention.

The connections can be made from the gage leads on the rotating shaft, to painted bus bars by taping leads to the Glyptal enamel with ends lying on bus bars and dabbing enough conductive coating material on the lead to resemble a soldered connection.

It is to be, of course, understood that the present invention is not limited to the specific materials, or even the method steps, disclosed in the specific, and preferred, embodiment disclosed. The invention is to be limited only by the scope of the appended claims.

What we claim as new and desire to secure by Letters Patent of the United States, is:

1. The combination including, a rotatable shaft member, means carried by the shaft member and producing an electrical signal, a layer of insulating material applied along a longitudinal section of the shaft and extending continuously about the circumference of the shaft, a layer of electrically conducting material which had been suspended in a binder in powder particle size and applied in paint form to a section of the layer of insulating material and extending about the shaft circumference, an electrical connection between the producing means and electrically conducting layer, and a sliding contact arranged to engage the electrically conducting material applied in paint form and including the producing means in an electrical circuit manifesting the electrical output of the producing means.

2. The method of forming a continuous conductive path about a rotating shaft including, cleaning the surface of the shaft, applying a layer of insulating material in paint form about a section of the shaft, applying a layer of electrically conductive material suspended in a liquid binder in paint form to a section of the layer of insulating material, applying heat to the conductive material until the binder is substantially driven to its surface, and polishing the conductive material to a smooth finish suitable for sliding engagement with an electrical contact.

3. The combination including, a rotatable shaft member, means carried by the shaft member and producing an electrical signal, a layer of insulating material applied along a longitudinal section of the shaft and extending continuously about the circumference of the shaft, a solution of silver in a fluid binder applied circumferentially to a section of the layer of insulating material with the binder substantially driven to the surface by a period of heating and the surface of the silver polished, an electrical connection between the responsive means and polished circumferential silver layer, and a sliding contact arranged to engage the silver layer and include the means producing an electric signal in an electric circuit manifesting the output of the producing means.

4. The combination of claim 3 in which the means producing the electric signal is a resistance type strain gage whose output varies in accordance with the shaft distortion.

5. The combination of claim 3 in which the insulating material is the General Electric Company's Glyptal No. 1201 red enamel applied in fluid form and dried at substantially 260° F. from 4 to 6 hours.

6. The combination of claim 5 in which the silver solution is Du Pont's Type A No. 4922 silver conductive coating.

References Cited in the file of this patent

UNITED STATES PATENTS

| Number | Name | Date |
|---|---|---|
| 1,819,246 | Jones | Aug. 18, 1931 |
| 2,434,438 | Ruge | Jan. 13, 1948 |
| 2,450,263 | Wise | Sept. 28, 1948 |
| 2,473,526 | Hood | June 21, 1949 |
| 2,478,536 | Koonz | Aug. 9, 1949 |
| 2,628,299 | Gaiser | Feb. 10, 1953 |

OTHER REFERENCES

Tech. Pub. "New Advances in Printed Circuits" Nat. Bur. of Standards, 192, 73 pages.